(12) United States Patent
Trang

(10) Patent No.: US 8,147,327 B2
(45) Date of Patent: Apr. 3, 2012

(54) METHOD FOR UPDATING A MULTIPLAYER GAME SESSION ON A MOBILE DEVICE

(75) Inventor: Linh Trang, Akarp (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1236 days.

(21) Appl. No.: 11/855,206

(22) Filed: Sep. 14, 2007

(65) Prior Publication Data

US 2009/0075735 A1    Mar. 19, 2009

(51) Int. Cl.
*A63F 9/24* (2006.01)
(52) U.S. Cl. .......................................................... 463/29
(58) Field of Classification Search ....................... 463/29
See application file for complete search history.

(56) References Cited

U.S. PATENT DOCUMENTS

| | | | |
|---|---|---|---|
| 2003/0177347 A1* | 9/2003 | Schneier et al. | 713/151 |
| 2004/0087373 A1* | 5/2004 | Choi | 463/42 |
| 2006/0211475 A1* | 9/2006 | Walker et al. | 463/16 |
| 2009/0143141 A1* | 6/2009 | Wells et al. | 463/37 |
| 2009/0312093 A1* | 12/2009 | Walker et al. | 463/25 |
| 2010/0105454 A1* | 4/2010 | Weber et al. | 463/1 |
| 2010/0190554 A1* | 7/2010 | Gagner et al. | 463/42 |
| 2011/0130188 A1* | 6/2011 | Walker et al. | 463/17 |

FOREIGN PATENT DOCUMENTS

| | | |
|---|---|---|
| WO | 0172064 A1 | 9/2001 |
| WO | 0219160 A | 3/2002 |

OTHER PUBLICATIONS

PCT International Search Report mailed Jan. 16, 2009 for International Application No. PCT/EP2008/059715.

* cited by examiner

*Primary Examiner* — Pierre E Elisca
(74) *Attorney, Agent, or Firm* — Coats & Bennett, P.L.L.C.

(57) ABSTRACT

A method for updating a game session comprises detecting a game event during a game session, sending an update request to a game data object server responsive to the game event, receiving a game data object from the game data server responsive to the update request, and updating the game session with the game data object. The update request preferably includes an event identifier associated with the game event and the identity of at least one game participant. Based on the player and event identified in the update request, the game data object server selects a corresponding game data object and sends the game data object to each of the players.

15 Claims, 4 Drawing Sheets

METHOD FOR UPDATING A MULTIPLAYER GAME SESSION ON A MOBILE DEVICE

BACKGROUND

The present invention relates generally to mobile gaming and, more particularly, to a method for updating a multiplayer game session on a mobile device.

The widespread availability of mobile communication devices, such as cellular telephones, personal digital assistants, and laptop computers, has lead to increasing demand for mobile game applications. In the past, most mobile game applications comprised single player applications that were pre-installed or downloaded into the memory of the mobile device. Many mobile devices have limited capabilities, such as small displays and limited memory. Further, many mobile devices may connect over communication links characterized by limited bandwidth and intermittent connectivity. These limitations make it difficult to implement multi-player games on mobile devices.

SUMMARY

The present invention relates generally to multi-player games designed to be played on mobile devices. The multi-player game may comprise a plurality of game stages or game scenarios that can be stored as game data objects at a game data object server connected to a communication network. The game data can be downloaded one at a time to the mobile devices to update a game session on the mobile devices. Because the game applications are executed independently on each of the mobile devices, the mobile devices do not have to remain connected to the network to continue playing the game. A mobile device involved in a multiplayer game may connect to the game server, download a game scenario, and disconnect while the scenario is played on the mobile device. When a game update is required, the mobile device can reconnect to the game server to request a game update.

One aspect of the present invention includes a method for updating a game session on a mobile device. The method comprises detecting a game event during a game session, sending an update request to a game data object server responsive to the game event, receiving a game data object from the game data server responsive to the update request, and updating the game session with the game data object. The update request preferably includes an event identifier associated with the game event and the identity of one or more game participants. The game data object server may select a game data object based on the event identifier and/or the game participants identified in the update request. The game data object is sent to all participants in the game and contains information for a new game stage or new game scenario.

DETAILED DESCRIPTION

Figure 1:
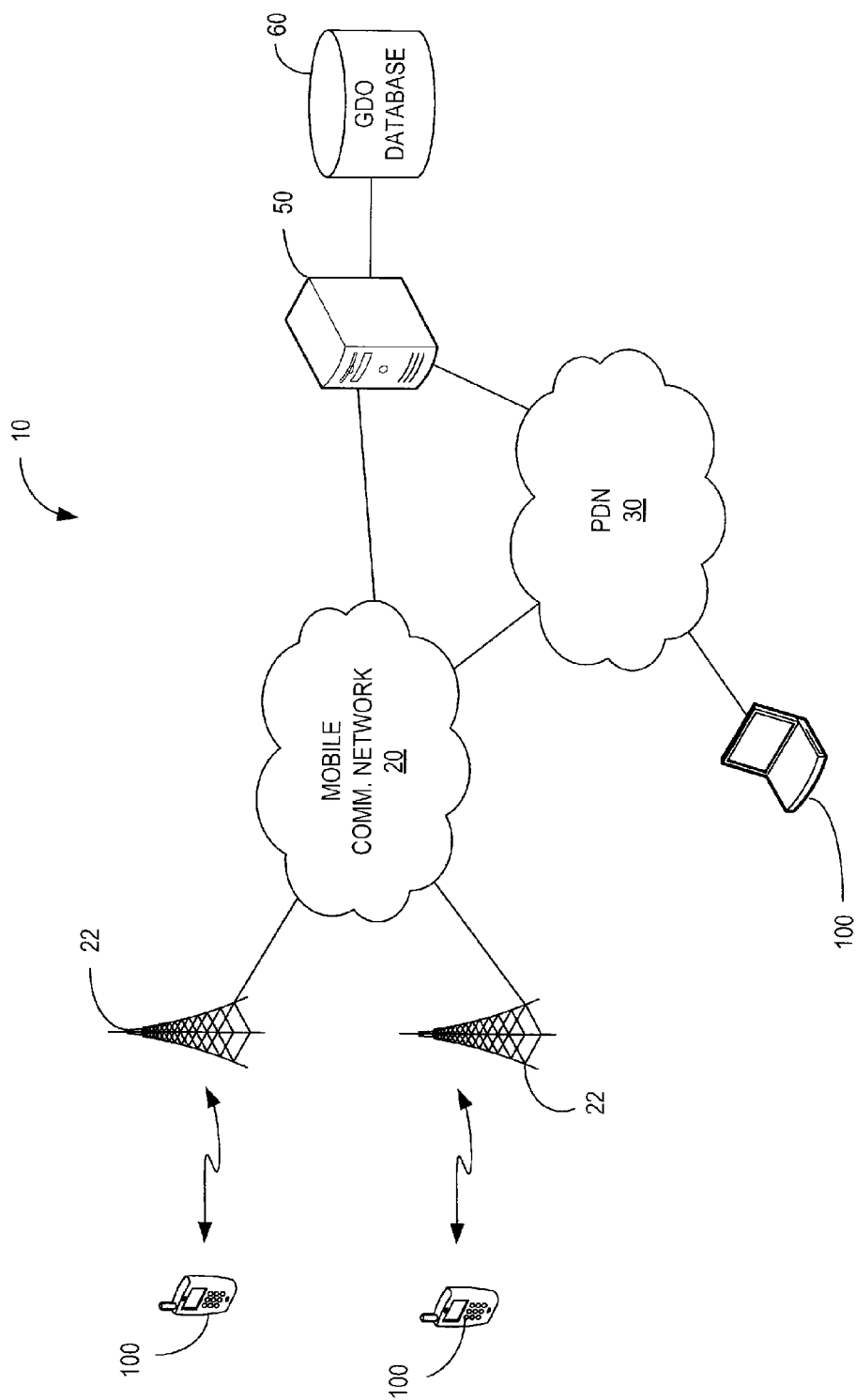
FIG. 1 illustrates an exemplary communication network for online gaming.

The present invention is described below in the context of a data communications network 10, shown in FIG. 1. Data communications network 10 provides networking capabilities for a plurality of mobile devices 100, which may comprise cellular telephones, personal digital assistants, laptop computers, or personal game devices. The data communications network 10 enables mobile device users to participate in multiplayer games. It should be appreciated, however, that the present invention is not limited to any specific type of data communications network or access technology.

The data communication network 10 comprises a mobile communication network 20 having one or more base stations or wireless access points 22 for communicating with mobile devices 100. The mobile communication network 20 provides packet data services to mobile devices 100 as is known in the art and may operate according to any conventional standard, such as GSM, WCDMA, WiFi, WiMAX, and LTE standards. Mobile communication network 20 connects to a Packet Data Network (PDN) 30. PDN 30 comprises a packet-switched network that implements conventional protocols, such as the suite of Internet protocols. The PDN 30 may comprise a public or private network, and may be a wide area or local area network. The Internet is one well-known example of a PDN 30. Mobile devices 100 may also connect to the PDN 30.

A game data object (GDO) server 50 connects to the mobile communication network 20 and/or PDN 30 and is accessible to the mobile devices 100 via the mobile communication network 20 and/or PDN 30. The GDO server 50 provides online gaming services to mobile devices 100 and may function as a game server. In one exemplary embodiment, the mobile devices 100 may have a game client installed for interacting with the GDO server 50. In other embodiments, the GDO server 50 may push game applications to the mobile devices 100 to enable players to play games with their mobile devices 100.

The GDO server 50 enables two or more players to engage in a multiplayer game without the need to remain connected to the network for the duration of the game session. The game may be embodied in a series of GDOs that are pushed to the user one at a time. Each GDO may represent a distinct game stage or game scenario. As described in more detail below, the mobile devices 100 may connect to the GDO server 50 to download a GDO containing a game stage. When the GDO is downloaded, the mobile device 100 can disconnect from the game server 50 while the game stage is played. When the game stage is completed, the mobile device 100 can reconnect to the GDO server 50 and request a new game stage.

The GDOs may contain state information that updates a game application executing on the players' mobile devices 100. When predetermined game events defined by a game stage or game scenario occur, the game client on the player's mobile device 100 sends an update request to the GDO server 50. In response to the update request, the GDO server 50 sends a new GDO containing a new game stage to the game players.

Figure 2:
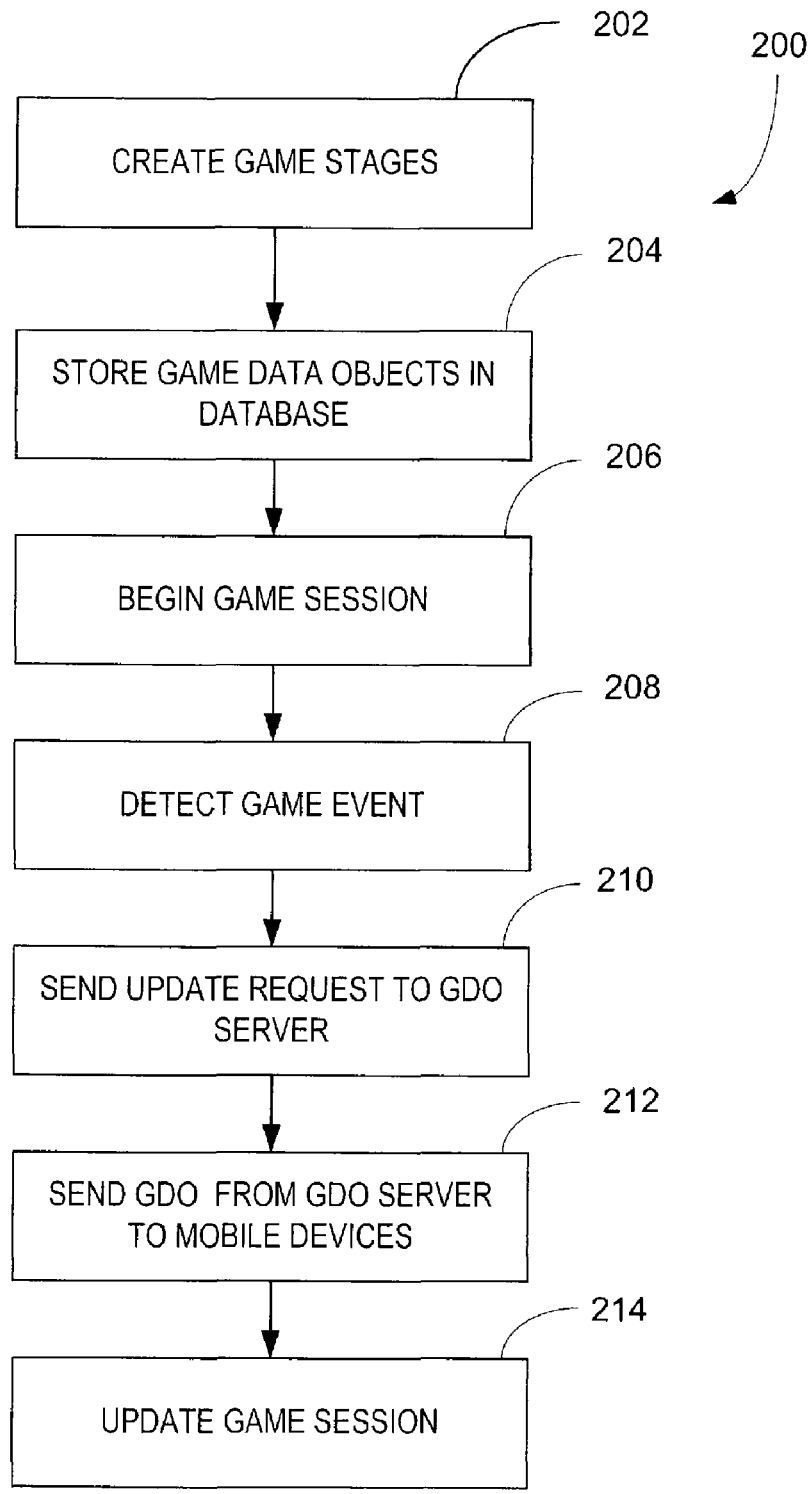
FIG. 2 illustrates an exemplary method of updating a game session on a mobile device.

FIG. 2 illustrates an exemplary method 200 for updating a game session according to one embodiment of the invention. To simplify the description, it is assumed that there are two game players, denoted herein as Player A and Player B. Those skilled in the art will appreciate, however, that the principals may be easily extended to three or more players.

The GDO server 50 may allow the players to create customized game stages or game scenarios that are unique to the particular players. Before beginning a gaming session, Player A and Player B may optionally log into the GDO server 50 to create or define one or more game stages or game scenarios (block 202). For example, the GDO server 50 may allow game players to define one or more events that may occur during a game stage, define characters in the game, define objects that appear in the game, and define rewards and penalties. The game stages or scenarios created by the players are stored as GDOs by the GDO server 50 (block 204).

When the players are ready to begin playing the game, the players establish a gaming session (block 206). At the start of the game session, a GDO corresponding to the first game stage is sent to each of the players. During the course of the game, the occurrence of certain predetermined game events defined by the game scenario will trigger the game application on the mobile device 100 to request an update from the GDO server 50. When a game event is detected requiring an update of the game session (block 208), the mobile device 100 connects to the GDO server 50 and sends an update request (block 210). The update request includes an event identifier to identify the game event that triggered the update request, and a player identifier that identifies at least one other game player. For example, if Player A's game client detects the game event, Player A's game client sends an update request including the identity of Player B. Conversely, if the Player B's game client detects the game event, the Player B's game client sends the update request including the identity of Player A. In response to the update request, the GDO server 50 sends a new GDO corresponding to a new game stage to both players (block 212). When the new GDO is received by the mobile device 50 (block 214), the game session is updated (block 216).

The game events that trigger game updates may comprise composite events. A composite event is an event having two or more components. For example, the game context may require a game player to move around in a real-world environment. The movement of the player in the real-world environment may be reflected in the virtual game environment. In this example, the game context may require the player to move to a predetermined location and perform some predetermined action. Thus, the composite game event comprises moving to location x and performing action y.

Figure 3:
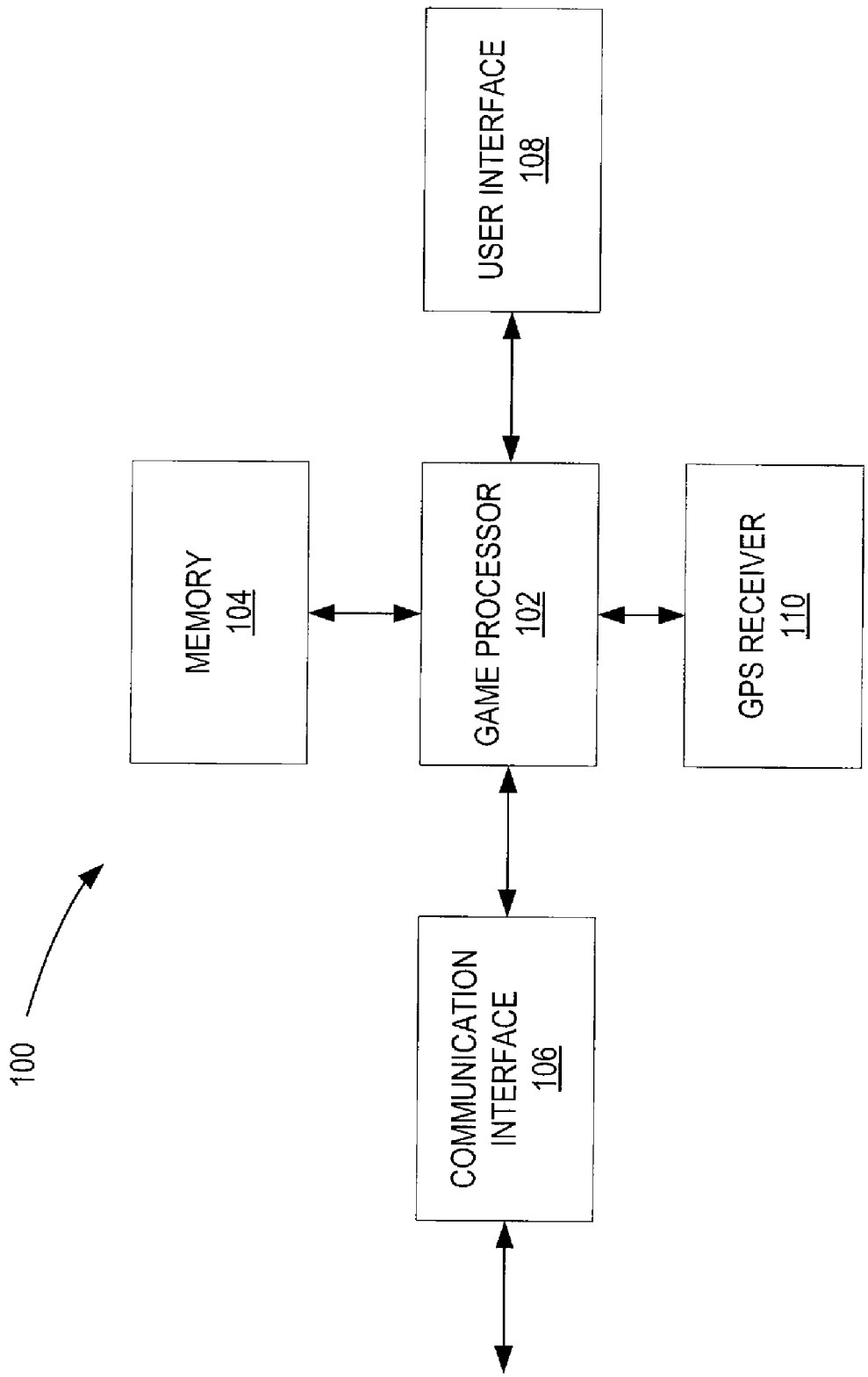
FIG. 3 illustrates an exemplary mobile device for playing multiplayer games.

FIG. 3 illustrates an exemplary mobile device 100 for online gaming The mobile device 100 comprises a game processor 102, memory 104, a communication interface 106, and a user interface 108. The game processor 102 may comprise one or more microprocessors, microcontrollers, hardware circuits, and/or a combination thereof, for executing game applications and for communicating with the GDO server 50. Memory 104 stores data and programs needed by the game processor 52. Memory 104 may comprise one or more discrete memory devices, such as random access memory, read-only memory, and flash memory. Communications interface 106 connects the mobile device to the communication network 10. The communication interface 106 may comprise, for example, a cellular transceiver, WiFi transceiver, an Ethernet interface, cable modem, or DSL interface. The user interface 108 may comprise a display for viewing game information and one or more input devices, such a keypad, joystick, etc for receiving user input. The mobile device 100 may further include a GPS receiver 110 for determining the location of the mobile device 100. Alternatively, the players' mobile device 100 may determine its location using triangulation techniques as is known in the art.

Figure 4:
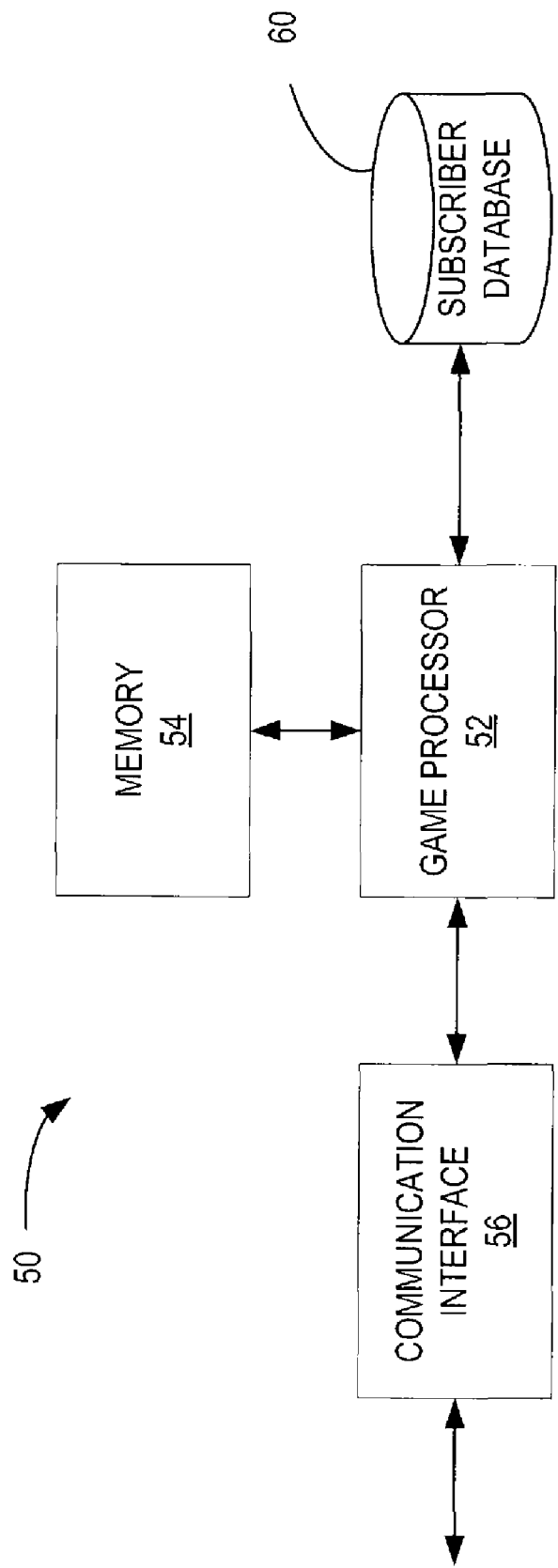
FIG. 4 illustrates an exemplary game data object server.

FIG. 4 illustrates an exemplary GDO server 50. The GDO server 50 comprises a game processor 52, memory 54, communication interface 56, and a mass storage device 60. The data processor 52 may comprise one or more microprocessors, microcontrollers, hardware circuits, and/or a combination thereof. Memory 54 stores data and programs needed by the data processor 52. Memory 54 may comprise one or more discrete memory devices, such as random access memory, read-only memory, and flash memory. Communications interface 56 connects the GDO server 50 to the packet data network 30 or mobile communication network 20. The communication interface 56 may comprise, for example, an Ethernet interface, cable modem, or DSL interface. The GDO server 50 receives update requests and sends GDO objects to players via the communication interface 56. The mass storage device 60, such as a magnetic or optical disk drive, stores game data objects.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of updating an online multiplayer game session by a mobile device of a participant in the multiplayer game, said method comprising:
   detecting a game event during a multiplayer game session;
   sending an update request to a game data object server responsive to said game event, said update request including the identity of one or more other game participants and an event identifier associated with the game event;
   receiving a game data object from the game data object server responsive to said update request, said game data object containing a game update corresponding to the one or more other game participants and game event specified in the update request;
   updating the multiplayer game session data object.

2. The method of claim 1 wherein the game event comprises a composite event.

3. The method of claim 2 wherein one component of the composite event comprises the game participant's location.

4. The method of claim 1 wherein the game data object comprises game state information for updating a game application executing on the mobile device.

5. The method of claim 1 wherein the game data object comprises a game application that can be executed on the mobile device.

6. A mobile device of a game participant for online multiplayer gaming comprising:
   a communication interface configured to connect said mobile device to a communication network; and
   a game processor configured to:
      communicate with a game data object server over said communication network;
      execute a game application for an online multiplayer game;
      detect a game event during a multiplayer game session;
      send an update request to a game data object server responsive to said game event, said update request including the identity of one or more other game participants and an event identifier associated with the game event;
      receive a game data object from the game data object server responsive to said update request, said game data object containing a game update corresponding to the one or more other game participants and game event specified in the update request;
      update the multiplayer game session with the game data object.

7. The mobile device of claim 6 wherein the game event comprises a composite event.

8. The mobile device of claim 7 wherein one component of the composite event comprises the game participant's location, and wherein the mobile device further comprises a location receiver to determine a location of the mobile device.

9. The mobile device of claim 6 wherein the game data object comprises game state information for updating the game application executing on the mobile device.

10. The mobile device of claim 6 wherein the game data object comprises a game application that can be executed by the game processor.

11. A game data object server comprising:
- a communication interface configured to connect two or more mobile devices of two or more game participants of an online multiplayer game session to a communication network;
- memory configured to store game data objects; and
- a multiplayer game processor configured to:
  - communicate with game clients on said two or more mobile terminals;
  - receive an update request from a game client that is on a mobile device of a game participant, said update request including the identity of one or more game participants and an event identifier associated with the game event; and
  - send a game data object to said game client and to said one or more other game clients that are on mobile devices of said one or more other game participants responsive to said update request, said game data object containing a game update corresponding to the one or more other game participants and game event specified in the update request.

12. The game data object server of claim 11 wherein the game event comprises a composite event.

13. The game data object server of claim 12 wherein on component of the composite event comprises the game participant's location.

14. The game data object server of claim 11 wherein the game data object comprises game state information for updating the game application executing on a mobile device.

15. The game data object server of claim 11 wherein the game data object comprises a game application that can be executed by a mobile device.

* * * * *